US006775365B1

(12) United States Patent
Norby

(10) Patent No.: US 6,775,365 B1
(45) Date of Patent: Aug. 10, 2004

(54) DIRECTED CALL RETURN SERVICE

(75) Inventor: Steven E. Norby, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 763 days.

(21) Appl. No.: 09/649,239

(22) Filed: Aug. 28, 2000

(51) Int. Cl.⁷ ............................................. H04M 17/00
(52) U.S. Cl. ................................................... 379/143
(58) Field of Search ........................... 705/1; 709/200; 379/143, 142, 111, 114.01

(56) References Cited

U.S. PATENT DOCUMENTS 6,154,532 A * 11/2000 Lockhart et al. ........... 379/143

6,574,324 B1 * 6/2003 Malik .................... 379/210.01

\* cited by examiner

Primary Examiner—David Y. Eng
(74) Attorney, Agent, or Firm—Brooks Kushman P.C.

(57) ABSTRACT

A method of providing a call return service wherein a first party, at a first customer premises equipment device, requests a service session with a first party service provider and enters an address for a second party, is provided. The service session signals a second customer premises equipment device at a second party, and a request is made on behalf of one of the parties to provide a directed call return service. The method further includes submitting, to the first party service provider, an authorization from the first party that the second party may direct a return call through the first party service provider while allowing the first party service provider to direct any charges for the return call to the first party.

8 Claims, 3 Drawing Sheets

DIRECTED CALL RETURN SERVICE

TECHNICAL FIELD

The present invention relates to a method of providing a call return service wherein a first party, at a first customer premises equipment device, requests a service session with a first party service provider and enters an address for a second party, and the second party is temporarily unavailable, for example, when the first party receives a busy signal or there is no answer by the second party.

BACKGROUND ART

When a first party places a call to a second party, sometimes the second party is temporarily unavailable. For example, the first caller may receive a busy signal, or the call rings the second party but is not answered, or the second party simply does not desire to receive a call at the present time. In existing telephony systems, when the second party returns the call, the second party initiates a new call and is billed for that call. As such, returning telephony calls may be disadvantageous to the second party because the second party receives the bill for a call that is made in response to a call received from the first party. For example, at the end of the day, the second party may return home and have a number of different messages on an answering machine. The second party then may choose to return those calls, and is billed for the return calls. The existing way for returning a telephony call is also disadvantageous to an interexchange carrier. For example, when the first party makes the original call, the first party uses its interexchange service. Because the call is not completed, possibly due to a busy signal or ring with no answer, the first party's interexchange service typically is not able to receive revenue for the call. When the second party returns the telephone call to the first party, the second party typically uses the second party's interexchange service of choice, and that interexchange service receives the revenue for the return call.

In summary, although existing telephony systems and services are commercially successful, the existing techniques for returning a telephony call have two primary disadvantages. First, the second party that is making the return call is billed for that call, even though the original call, if completed, would have been billed to the first party. Second, the second party's interexchange service receives the revenue for the return call, even though if the first telephone call was completed, the first party's interexchange service would have received the revenue for the call.

For the foregoing reasons, there is a need for a method of providing a call return service that overcomes the disadvantages in existing techniques for returning telephony calls.

DISCLOSURE OF INVENTION

It is, therefore, an object of the present invention to provide a method of providing a call return service that allows the bill for the return call to be directed to the original calling party and allows the original interexchange service to receive the revenue from the return call.

In carrying out the above object, a method of providing a call return service wherein a first party, at a first customer premises equipment device, requests a service session with a first party service provider and enters an address for a second party, is provided. The service session signals a second customer premises equipment device at the second party, and a request is made on behalf of one of the first and second parties to provide a directed call return service. The method further comprises submitting, to the first party service provider, an authorization from the first party that the second party may direct a return call through the first party service provider while allowing the first party service provider to direct any charges for the return call to the first party.

In one embodiment, the request to provide the directed call return service is made on behalf of the first party, when the first party enters a predetermined code to the service session using the first customer premises equipment device. In another embodiment, the request to provide the directed call return service is made on behalf of the second party by the second customer premises equipment device.

Preferably, the method further comprises submitting, to the first party service provider, a time limit from the first party that limits when the second party may direct the return call with any charges for the return call being directed to the first party.

In a preferred embodiment, the method further comprises disconnecting the first party, and creating a call detail record for the service session. Further, a call back signal is submitted to the second calling party, and includes an address for the first party. The call back signal preferably is submitted to the second party customer premises equipment device. More preferably, the call back signal further includes a casual dialing code for the first party service provider. The casual dialing code allows the second party to select the first party service provider when making the return call to allow the first party service provider to receive the call revenue. That is, in preferred embodiments of the present invention, the first calling party service provider receives the call revenue for the return call, and the return call is billed to the first party. More preferably, the method further comprises ending the initial service session, and upon request by the second party, requesting a call back service session with the first party service provider and entering the address for the first party so as to direct the return call through the first party service provider, and direct any charges for the first call to the first party. A call detail record is created for the call back service session and is charged to the first party.

Further, in carrying out the present invention, a method of providing a call return service wherein a first party, at a first customer premises equipment device, requests a service session with a first party service provider and enters an address for a second party, is provided. The service session signals a second customer premises equipment device at the second party, and a request is made on behalf of one of the first and second parties to provide a directed call return service. The method further comprises submitting, to the first party service provider, an authorization from the first party that the second party may direct a return call through the first party service provider while allowing the first party service provider to direct any charges for the return call to the first party. The method further comprises submitting, to the second calling party, a call back signal including an address for the first party, and including a casual dialing code for the first party service provider.

In one embodiment, the request to provide the directed call return service is made on behalf of the first party when the first party enters a predetermined code to the service session using the first customer premises equipment device. In another embodiment, the request to provide the directed call return service is made on behalf of the second party by the second customer premises equipment device.

Still further, in carrying out the present invention, an intelligent customer premises equipment device is provided.

That is, in preferred embodiments, the second party has an intelligent customer premises equipment device for implementing the present invention. Of course, in the alternative, embodiments of the present invention comprehend implementing the directed call return service at the second calling party local switch and the second calling party would need to access information at the local switch to determine whether any directed return calls have been requested. The intelligent customer premises equipment device is for use in a method of providing a call return service wherein a first party, at a different customer premises equipment device (not necessarily an intelligent customer premises equipment device), request a service session with a first party service provider and enters an address for a second party. The service session signals the intelligent customer premises equipment device at the second party, and a request is made on behalf of one of the first and second parties to provide a directed call return service. The method further includes submitting, to the first party service provider, an authorization from the first party that the second party may direct a return call through the first party service provider while allowing the first party service provider to direct any charges for the return call to the first party. The intelligent customer premises equipment device is programmed such that when a call back signal, including an address for the first party and including a dialing code for the first party service provider is submitted to the intelligent customer premises equipment device, the intelligent device indicates to the second party that a directed call back is waiting. The directed return call is made, for example, by pressing a button on the intelligent customer premises equipment device.

The advantages associated with embodiments of the present invention are numerous. For example, embodiments of the present invention provide a directed call return service that is an interexchange service in which a previous, but unsuccessful call attempt by a first party triggers a return call by the called party, and the return call is billed to the original (first) calling party. Further, in preferred embodiments of the present invention, the same interexchange service is used for the return call as was used for the original call. Preferred embodiments of the directed call return service have two primary advantages. First, the service enables a return call from an unsuccessful attempt (for example, busy or ring no answer) to be placed and billed to the original party that wished to call the unsuccessful destination. For example, if a long distance call is placed to a called party and the called party does not answer, the caller can have the other party call back under reverse charges (the original party gets the bill, not the party returning the call). Secondly, the directed call return service of embodiments of the present invention is useful, in preferred embodiments, to the originating party's interexchange carrier, as the call back uses that interexchange carrier's network and services and not those of the original called party. This latter benefit enables the interexchange carrier representing the original calling party to receive the revenue for the return call. Existing systems do not allow either of these possibilities.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
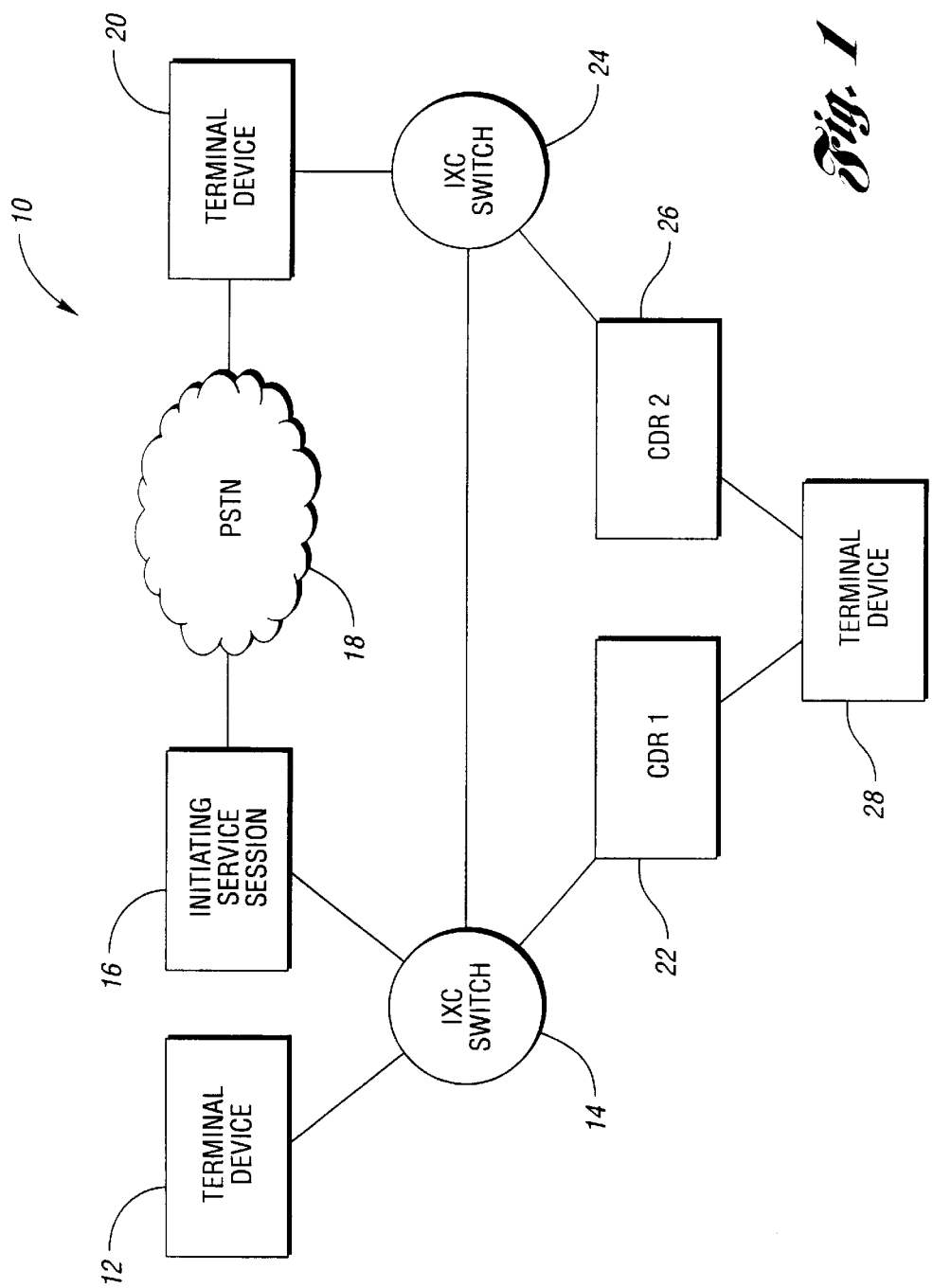
FIG. 1 is a block diagram illustrating directed call return service in accordance with the present invention.

In FIG. 1, a diagram illustrates the directed call return service in the preferred embodiment of the present invention, generally, at 10. Briefly, the first party, at terminal device 12, places a call through the interexchange carrier switch 14 that is local to the first party. The first party initiates a service session at block 16, and enters the address of the second party. The call is routed over the public switched telephone network 18 to the second party terminal device 20. In preferred embodiments of the present invention, terminal device 20 is an intelligent terminal device, however, alternative embodiments of the present invention may implement the intelligent functionality at a local switch of the second party. Upon receiving a busy signal or no answer at terminal device 20, the first caller may elect to allow a directed return call. Alternatively, the second party or second party's terminal device may request a directed return call, and the first calling party would have the option to approve the request. In the event that either the first party opts for a directed return call or accepts the request of the second party for a directed return call, the directed return call is then set up. The call detail record 22 for the present service session is billed to the first party. A more detailed description of embodiments of the present invention is explained with reference to FIGS. 2 and 3 below, but with continuing reference to FIG. 1, briefly, when the second party decides to return the phone call, the call is preferably routed to the interexchange carrier switch 24 that is local to the second party. That is, in preferred embodiments, the same interexchange carrier is used for the return call as was used for the original call. Further, the call detail record 26 for the return call is processed together with the call detail record 22 at bill processing block 24, billing both calls to the initial calling party.

Figure 2:
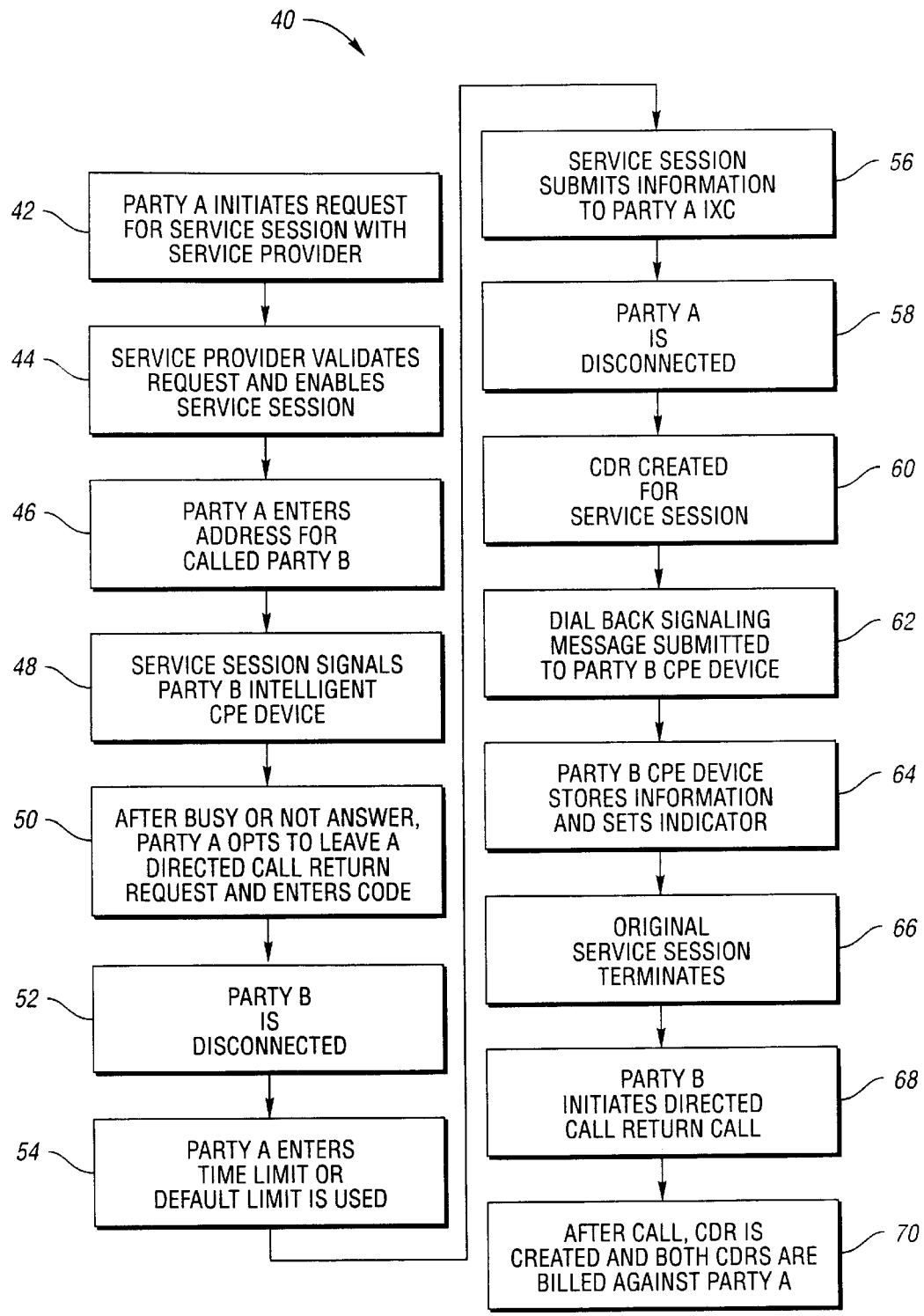
FIG. 2 is a block diagram illustrating a method of the present invention.

A more detailed description of a preferred embodiment of the present invention is indicated in FIG. 2 at 40. Specifically, at block 42, the first or calling party, Party A, initiates a request for a service session with their service provider. At block 42, the service provider validates the calling party request and enables the requested session. At block 46, calling party A interacts with the service session and enters an address for a called Party B (for example, an E.164 address) to the service provider service session. The calling Party A initiated service session signals the called Party B's intelligent customer premises equipment to notify the received station of the incoming call attempt, at block 48.

In the embodiment as shown in FIG. 2, after a period of ringing or alerting, calling Party A decides that the call will not be answered by Party B (or a busy signal is received), and calling Party A signals the initiating service session that it wishes to leave a directed call return request to Party B, at block 50. Calling Party A enters a unique code to the initiating service session instructing it to set up a directed call return service for the called Party B. The connection to called Party B is disconnected, at block 52. The initiating service session prompts the calling Party A to enter a time interval during which the directed call return service will be available for use by the called Party B. A default time interval may be set by the service session parameters, or Party A may specify a time duration for keeping the directed call return feature active (block 54).

The initiating service submits information to calling Party A's interexchange carrier that called Party B has been authorized to place a call back to calling Party A during a specified period of time which is to be billed back to calling Party A (block 56). Calling Party A then disconnects (block 58).

A call detail record for calling Party A's initiating service session with the directed call return service indicator is prepared by the initiating service session, at block 60. The information in this call detail record will be applied against the call detail record established for the later directed call return call at the time of the next successful call completion attempt by Party B to Party A occurring within the time interval specified by Party A. The initiating service session submits to the intelligent terminal device of called Party B a dial-back signaling message that includes the calling party's telephone number and the (for example, 7-digit) casual dialing code for the calling Party A's interexchange carrier, at block 62. The dial-back signaling message may also include the time before which the directed call return service will expire from block 54. That is, at a minimum, the dial-back signaling message includes all information needed by called Party B to return a call to calling Party A, over calling Party A's interexchange carrier, with the call being billed to calling Party A.

Party B's intelligent terminal device receives the dial back signaling message, stores the pertinent calling number, casual dialing code, and other information into a local register, and initiates a local message indication application, at block 64. The call return message indication application enables a visual indicator such as a text message, a text or graphical code or symbol, or an illuminated lamp on Party B's terminal device. The lamp illumination may be either a steady or a flashing indicator. The call return service indication will remain active for the call back period of time specified by calling Party A or the successful completion of the directed call return feature. At this point, the original service session terminates (block 66).

Upon visualizing the message indication for a directed return call on the terminal device, Party B may activate the directed call return feature by entering the dial-back information required to call back Party A. The dial-back information consists of the casual calling dialing code for Party A's interexchange service provider followed by Party A's telephone address. The dial-back information may be explicitly entered by Party B or may be automatically entered through a dialing application (for example, speed dialing) available on Party B's intelligent terminal device. Party B initiating the directed call return is indicated at block 68. The directed call return call is initiated by Party B, set up using standard telecommunications call initialization, dialing, and signaling procedures for use by Party A's interexchange carrier. Call detail records are maintained by Party A's interexchange carrier switch that services Party B. At the conclusion of the call, a call detail record for the completed directed call return call is created by the switch serving Party B (block 70). At bill processing, both the original Party A call detail record and the Party B call back call detail records are employed to create a billing record for the call against Party A (bill processing block 28, FIG. 1).

Figure 3:
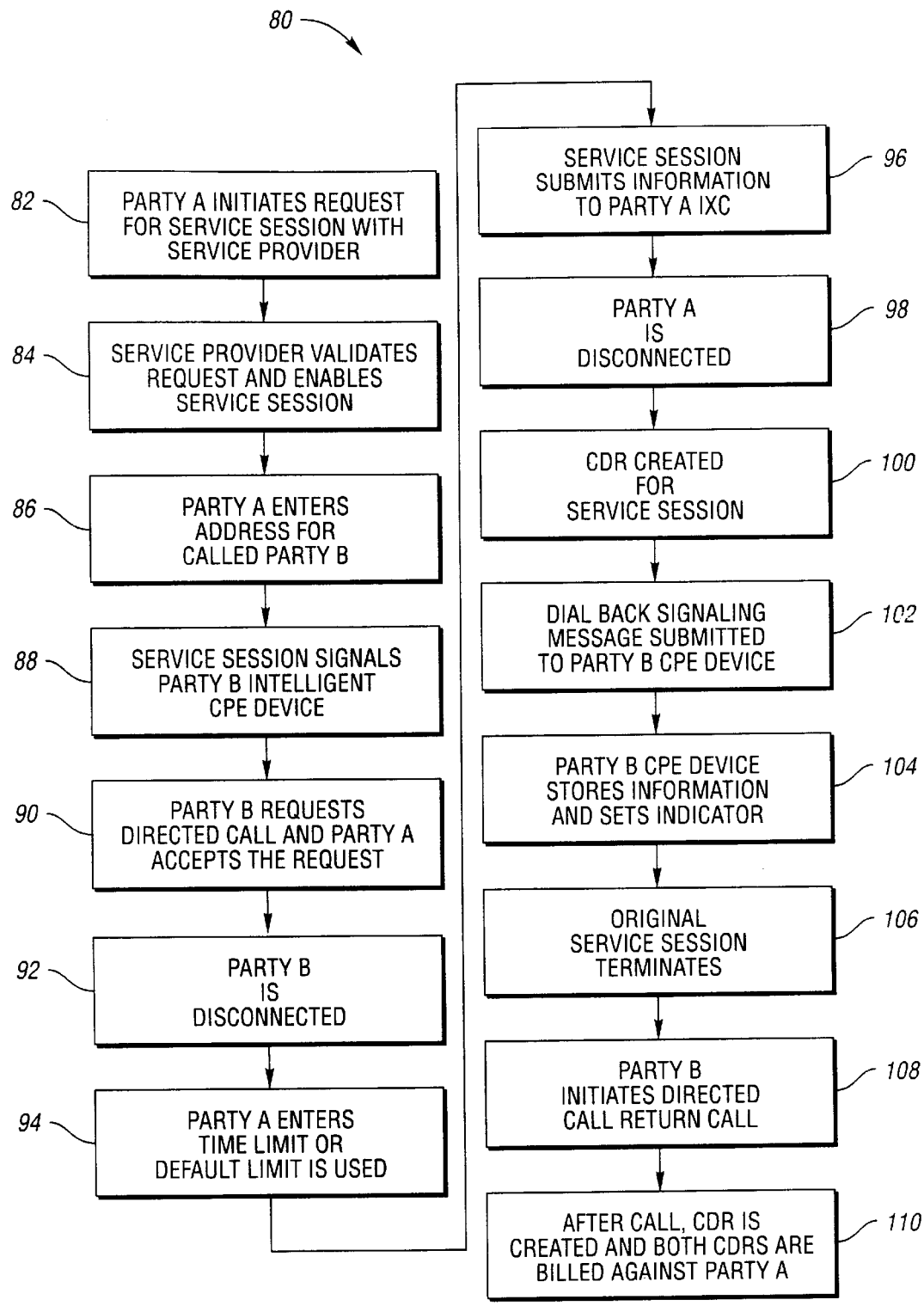
FIG. 3 is a block diagram illustrating an alternative method of the present invention.

FIG. 3 illustrates an alternative embodiment of the present invention wherein called Party B requests Party A's originating service session to employ a directed call return service for later communication with Party A. This option can be applied in the event Party B is busy and wishes Party A to allow a directed call return. Portions of the sequence events are similar to those in FIG. 2. In FIG. 3, Party A initiates a request for a service session with the service provider at block 82. The service provider validates the calling party request and enables the requested session at block 84. At block 86, Party A enters the address for called Party B. At block 88, the service session signals Party B's intelligent customer premises equipment device. At block 90, Party B requests directed call return and Party A accepts the request. That is, called Party B's intelligent terminal device response to the originating service session of the calling Party A with a signal that requests a directed call return service be implemented on behalf of Party A for later use by Party B (the request is made on behalf of B for directed call return on behalf of A). Calling Party A is informed of the request by Party B to enable a directed call return service for Party B to use at a later time.

Calling Party A either accepts the request and initiates the directed call return feature or denies called Party B's request. If the request is denied, Party A and Party B are disconnected. If the request is accepted, the directed call return feature is initialized. Party B is disconnected at block 92. The remainder of the sequence of events in FIG. 3 is similar to that described in FIG. 2, and is for this reason, only described briefly herein. At block 94, Party A enters a time limit or a default time limit is used. In blocks 96–110, the remainder of the directed call return process is illustrated. In summary, the initial service session submits information to Party A's interexchange carrier and Party A is disconnected. A call detail record is created for the service session, and a dial back signaling message is submitted to Party B's customer premises equipment device. Party B's device stores the information and sets an indicator. The original service session terminates and Party B initiates a directed call return call. After the call, the call detail record is created and both call detail records are billed against Party A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing a call return service wherein a first party, at a first customer premises equipment device, requests a service session with a first party service provider and enters an address for a second party, and the service session signals a second customer premises equipment device at the second party, and wherein a request is made on behalf of one of the first and second parties to provide a directed call return service, the method further comprising:

submitting, to the first party service provider, an authorization from the first party that the second party may direct a return call over a network through the first party service provider while allowing the first party service provider to direct any charges for the return call to the first party;

submitting, to the second calling party, a call back signal including an address for the first party and including a dialing code for the first party service provider; and connecting the return call from the second calling party through the first party service provider over the network.

2. The method of claim 1 wherein the request to provide the directed call return service is made on behalf of the first party when the first party enters a predetermined code to the service session using the first customer premises equipment device.

3. The method of claim 1 wherein the request to provide the directed call return service is made on behalf of the second party by the second customer premises equipment device.

4. The method of claim 1 further comprising:

submitting, to the first party service provider, a time limit from the first party that limits when the second party may direct the return call with any charges for the return call being directed to the first party.

5. The method of claim 1 further comprising:

disconnecting the first party; and creating a call detail record for the service session.

6. The method of claim 1 wherein the call back signal is submitted to the second customer premises equipment device.

7. The method of claim 1 further comprising:

ending the service session; and upon request by the second party, requesting a call back service session with the first party service provider and entering the address for the first party so as to direct the return call through the first party service provider and direct any charges for the first call to the first party.

8. The method of claim 7 further comprising:

creating a call detail record for the call back service session that is charged to the first party.

* * * * *